US011070886B2

(12) United States Patent
Huang et al.

(10) Patent No.: US 11,070,886 B2
(45) Date of Patent: Jul. 20, 2021

(54) METHOD AND APPARATUS FOR LOOPING A VIDEO FILE

(71) Applicant: HONG KONG LIVEME CORPORATION LIMITED, Hong Kong (CN)

(72) Inventors: Ruimin Huang, Camana Bay (KY); Pengbo Yang, Camana Bay (KY); Wei Liu, Camana Bay (KY); Hang Wei, Camana Bay (KY); Shuaifeng Deng, Camana Bay (KY); He Li, Camana Bay (KY); Qingjie Zhang, Camana Bay (KY); Hao Tian, Camana Bay (KY); Chao Wang, Camana Bay (KY); Jun Peng, Camana Bay (KY); Zhen Li, Camana Bay (KY); Qi Xu, Camana Bay (KY); Yiqing Huang, Camana Bay (KY)

(73) Assignee: HONG KONG LIVEME CORPORATION LIMITED, Hong Kong (HK)

( * ) Notice: Subject to any disclaimer, the term of this patent is extended or adjusted under 35 U.S.C. 154(b) by 307 days.

(21) Appl. No.: 16/307,902

(22) PCT Filed: Oct. 19, 2017

(86) PCT No.: PCT/CN2017/106904
§ 371 (c)(1),
(2) Date: Dec. 6, 2018

(87) PCT Pub. No.: WO2019/024258
PCT Pub. Date: Feb. 7, 2019

(65) Prior Publication Data
US 2021/0029410 A1    Jan. 28, 2021

(30) Foreign Application Priority Data
Aug. 3, 2017    (CN) .......................... 201710657657.9

(51) Int. Cl.
H04N 21/472    (2011.01)
H04N 21/433    (2011.01)
H04N 21/845    (2011.01)

(52) U.S. Cl.
CPC ... H04N 21/47217 (2013.01); H04N 21/4333 (2013.01); H04N 21/47202 (2013.01); H04N 21/8456 (2013.01)

(58) Field of Classification Search
CPC ......... H04N 21/47217; H04N 21/4333; H04N 21/47202; H04N 21/8456
See application file for complete search history.

(56) References Cited

U.S. PATENT DOCUMENTS 7,035,333 B2     4/2006   Stenzel
7,823,056 B1 *  10/2010   Davey .................... G11B 27/34
                                                      715/202
(Continued)

FOREIGN PATENT DOCUMENTS

CN    102520864 A    6/2012
CN    103327318 A    9/2013
(Continued)

OTHER PUBLICATIONS

Hdmicables. "A Question for Editing a GIF Image (Play a gif forward, then backward, and then repeatedly)," Baidu Zhidao, Jul. 27, 2012. Retrieved from https://zhidao.baidu.com/question/455027241.html, 2 pages.
International Search Report for PCT/CN2017/106904, dated Mar. 1, 2018, 3 pages.
(Continued)

Primary Examiner — Mishawn N. Hunter
(74) Attorney, Agent, or Firm — Cozen O'Connor

(57) ABSTRACT

The embodiments of the present application provide a method and an apparatus for releasing a video file, which are applied to a server. The method comprises obtaining a video
(Continued)

file to be released; selecting a first preset number of video frames in the video file to be released; generating a target video file from the selected video frames, determining a target display position in a video preview interface for the target video file; and saving a correspondence between the target display position and the target video file such that a first terminal logging in the server can play the target video file at the target display position in the video preview interface based on the correspondence. As can be seen, since the first terminal plays the target video file at the target display position in the video preview interface, the user can get more information about contents of the video file to be released from the target video file, which improves user experience.

8 Claims, 2 Drawing Sheets

(56) References Cited

U.S. PATENT DOCUMENTS

| | | |
|---|---|---|
| 2005/0175314 A1 | 8/2005 | Hu |
| 2017/0180817 A1 | 6/2017 | Thompson et al. |

FOREIGN PATENT DOCUMENTS

| | | |
|---|---|---|
| CN | 104144318 A | 11/2014 |
| CN | 104639954 A | 5/2015 |
| CN | 105323483 A | 2/2016 |
| CN | 105409201 A | 3/2016 |
| CN | 105872700 A | 8/2016 |
| EP | 2 635 025 A1 | 9/2013 |

\* cited by examiner

METHOD AND APPARATUS FOR LOOPING A VIDEO FILE

The present application claims the priority to a Chinese patent application No. 201710657657.9, filed with the State Intellectual Property Office of People's Republic of China on Aug. 3, 2017 and entitled "Method and Apparatus for Looping a video file", which is incorporated herein by reference in its entirety.

TECHNICAL FIELD

The present application relates to the field of video processing, and in particular to a method and an apparatus for looping a video file.

BACKGROUND

In recent years, with the rapid development of video related technologies, videos appear almost everywhere on the Internet. For example, videos have become an indispensable part in video playing websites, live broadcast applications, and the like. As a form of video presentation, small videos are getting more and more attention of people. A small video refers to a video that has a short duration and contains a small number of video frames, for example, a video containing 6 video frames, 9 video frames, or the like. Small videos have a very wide range of uses. For example, in a video preview interface of some applications, in order to allow a user to see the synopsis or the highlight of a complete video, a small video generated from the complete video is often displayed as a preview video for the user to watch.

Due to the short duration, which is usually only a few seconds, a small video is generally looped, that is to say, the small video is played from the first frame to the last frame in positive order, and then from the first frame until the last frame again in such a loop. For example, if a small video contains 8 frames, the small video is played from the first frame to the eighth frame, and after the eighth framed is played, it is played from the first frame to the eighth frame again in such a loop.

Since the content of the last frame of a small video as a video preview often has a large difference from the content of the first frame, if the small video is played in the way described above, i.e. after the last frame is played, jumping to and playing the first frame directly, a user will feel flicker while watching, resulting in poor user experience.

SUMMARY

The embodiments of the present application aim to provide a method and an apparatus for looping a video, to reduce a flickering feeling brought to a user when playing a video and improve user experience. Specifically, the technical solutions are as follows.

In a first aspect, an embodiment of the present application provides a first method for looping a video file. The method comprises:

playing video frames of the video file in positive order after a playing instruction for a video file is obtained;

playing the video frames of the video file in reverse order until a first preset video frame after the last video frame of the video file is played;

returning to the step of playing video frames of the video file in positive order, and stopping playing the video file until a stop playing instruction is obtained.

Optionally, each of the video frames of the video file contains a video frame identifier.

The step of playing the video frames of the video file in reverse order until a first preset video frame comprises:

obtaining a second-to-last video frame of the video file based on the video frame identifier contained in each of the video frames;

playing the video frames of the video file in reverse order starting from the second-to-last video frame until a first preset video frame.

Optionally, the first preset video frame is the second video frame of the video file.

In a second aspect, an embodiment of the present application provides a second method for looping a video file. The method comprises:

obtaining a first video file to be played;

parsing the first video file to obtain a preset number of video frames at the end of the first video file;

adding the obtained preset number of video frames in reverse order behind the last video frame of the first video file to generate a second video file;

looping video frames of the second video file in positive order after a playing instruction for the first video file is obtained, and stopping playing the second video file until a stop playing instruction for the first video file is obtained.

Optionally, each of the video frames of the first video file contains a video frame identifier.

The step of parsing the first video file to obtain a preset number of video frames at the end of the first video file comprises:

parsing the first video file to obtain a video frame identifier contained in each of the video frames;

obtaining a preset number of video frames from a second-to-last video frame to a second preset video frame in the first video file based on the obtained video frame identifiers.

Optionally, the second preset video frame is the second video frame of the first video file.

In a third aspect, an embodiment of the present application provides an apparatus for looping a video file. The apparatus comprises:

a positive order playing module, configured for playing video frames of the video file in positive order after a playing instruction for a video file is obtained;

a reverse order playing module, configured for playing the video frames of the video file in reverse order until a first preset video frame after the last video frame of the video file is played, and triggering the positive order playing module;

a stop playing module, configured for stopping playing the video file when a stop playing instruction is obtained.

Optionally, each of the video frames of the video file contains a video frame identifier.

The reverse order playing module comprises:

a video frame determining unit, configured for obtaining a second-to-last video frame of the video file based on the video frame identifier contained in each of the video frames;

a reverse order playing unit, configured for playing the video frames of the video file in reverse order starting from the second-to-last video frame until a first preset video frame.

Optionally, the first preset video frame is the second video frame of the video file.

In a fourth aspect, an embodiment of the present application provides another apparatus for looping a video file. The apparatus comprises:

a video file obtaining module, configured for obtaining a first video file to be played;

a video file parsing module, configured for parsing the first video file to obtain a preset number of video frames at the end of the first video file;

a video file generating module, configured for adding the obtained preset number of video frames in reverse order behind the last video frame of the first video file to generate a second video file;

a video looping module, configured for looping video frames of the second video file in positive order after a playing instruction for the first video file is obtained, and stopping playing the second video file until a stop playing instruction for the first video file is obtained.

Optionally, each of the video frames of the first video file contains a video frame identifier.

The video file parsing module comprises:

a video frame identifier obtaining unit, configured for parsing the first video file to obtain a video frame identifier contained in each of the video frames;

a video frame obtaining unit, configured for obtaining a preset number of video frames from a second-to-last video frame to a second preset video frame in the first video file based on the obtained video frame identifiers.

Optionally, the second preset video frame is the second video frame of the first video file.

An embodiment of the present application provides an electronic device comprising a processor, communication interfaces, a memory and a communication bus, wherein the processor, the communication interfaces and the memory communicate with each other via the communication bus.

The memory is configured for storing computer program.

The processor is configured for implementing steps of the first method described above when executing the program stored in the memory.

An embodiment of the present application provides a computer readable storage medium. The computer readable storage medium stores computer program therein, and the computer program implements steps of the first method described above when being executed by a processor.

An embodiment of the present application provides another electronic device, which comprises a processor, communication interfaces, a memory and a communication bus, wherein the processor, the communication interfaces and the memory communicate with each other via the communication bus.

The memory is configured for storing computer program.

The processor is configured for implementing steps of the second method described above when executing the program stored in the memory.

An embodiment of the present application provides another computer readable storage medium. The computer readable storage medium stores computer program therein, and the computer program implements steps of the second method described above when being executed by a processor.

In addition, an embodiment of the present application provides a computer program product for performing steps of the first method described above when being executed.

An embodiment of the present application provides a second computer program product for performing steps of the second method described above when being executed.

In the solution provided by the embodiments of the present application, video frames of the video file is played in positive order after a playing instruction for a video file is obtained, the video file is played in reverse order until a first preset video frame after the last video frame of the video file is played, and then returning to the step of looping video frames of the video file in positive order until a stop playing instruction is obtained. As can be seen, the solution breaks through the traditional thinking pattern that looping a video must jump from the last frame to the first frame to loop. In particular for a small video, when a small video is looped, the video file is played in positive order and then played in reverse order until a first preset video frame. Since the jumping of contents of the video file is small, the flickering feeling brought to a user when a video file is played can be reduced and user experience can be improved.

BRIEF DESCRIPTION OF THE DRAWINGS

In order to explain the technical solutions of embodiments of the application or of the prior art more clearly, a simple introduction of the drawings required in the description of the embodiments and of the prior art will be given. Obviously, the drawings described below are just those of some embodiments of the present application and other drawings can be obtained by those of ordinary skills in the art without any creative efforts based on these drawings.

DETAILED DESCRIPTION

The technical solutions in embodiments of the present application will be described in detail with reference to the drawings in embodiments of the present application. Obviously, the embodiments described are merely some of the embodiments of the present application, instead of all the embodiments. All other embodiments obtained by those of ordinary skills in the art based on the embodiments herein without any creative efforts are within the scope of the present application.

In order to reduce a flickering feeling brought to a user when playing a video file and to improve user experience, the embodiments of the present application provide a method, an apparatus, an electronic device and a computer readable storage medium for looping a video file.

The first method for looping a video file provided by an embodiment of the present application will be described below.

First, it should be noted that the first method for looping a video file provided by the embodiment of the present application can be applied to any electronic device capable of playing a video file (hereafter referred to as an electronic device), for example, a mobile phone, a computer, a tablet, a smart watch and the like, which is not specifically limited herein.

Figure 1:
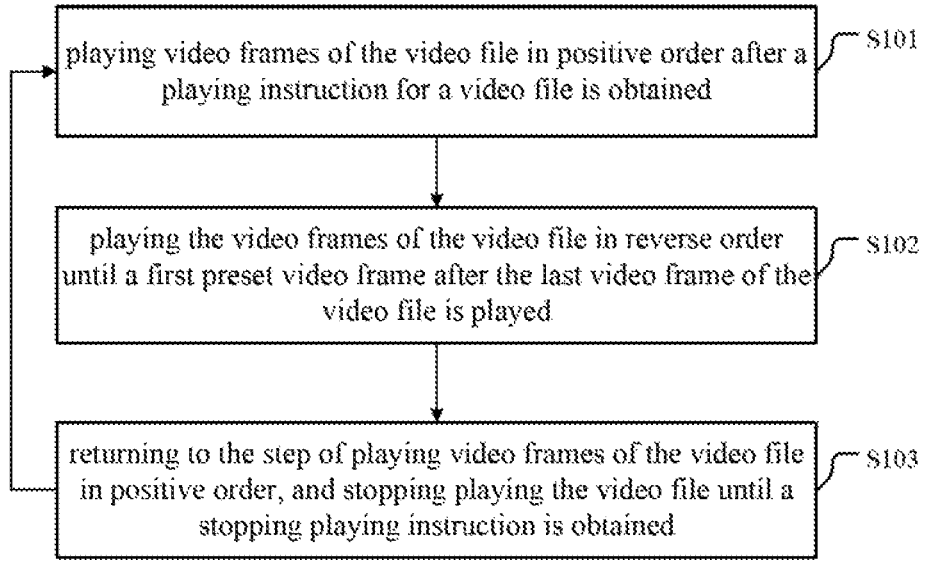
FIG. 1 is a flow chart of the first method for looping a video file provided by an embodiment of the present application.

FIG. 1 shows a method for looping a video file. The method comprises:

S101, playing video frames of the video file in positive order after a playing instruction for a video file is obtained;

It can be understood that the video file described above is generally a video file stored in an electronic device. In a case where the electronic device has a camera, the video file can be a video file taken by a user via the camera of the electronic device. Of course, the video file can be a video file downloaded from the Internet by the user, such as a small video file, or can be a video file sent by another device that established a communication connection with the electronic device.

In an implementation, the electronic device can provide a playing instruction entry, such as a play button or the like. When a user wants to play the video file, he can send a playing instruction via the playing instruction entry, and then the electronic device can obtain the playing instruction. It can be understood that the electronic device can create a correspondence between the playing instruction entry and the video file in advance. After obtaining the playing instruction, the electronic device can find the video file. Of course, the playing instruction can carry identification information of the video file, so that after obtaining the playing instruction, the electronic device can find the video file corresponding to the identification information.

For example, if the video file is a small video file in a video preview interface of an application, the playing instruction entry can be the video preview interface. When a user starts the video preview interface, the electronic device can obtain a playing instruction.

In another implementation, the playing instruction can be sent by a user via another device that establishes a communication connection with the electronic device, and the electronic device obtains the playing instruction when receiving the playing instruction.

After obtaining the playing instruction described above, the electronic device can play the video frames of the video file in positive order. It can be understood that playing video frames in positive order means that the video frames are played from the first video frame and then the second video frame until the last video frame of the video file. For example, if the video frames comprise 6 frames, video frames of the video file are played in positive order means that the video frames are played from the first video frame and then the second video frame until the last video frame (i.e. the sixth video frame) of the video file. The approach for playing video frames can be any video playing approach in related art, for example, each of the video frames can be determined based on information such as video frame identifier, and then playing the video frames, which is not specifically limited herein.

S102, playing the video frames of the video file in reverse order until a first preset video frame after the last video frame of the video file is played.

After playing the last video frame of the video file, the electronic device can play the video frames of the video file in reverse order until the first preset video frame. It can be understood that playing the video frames in reverse order means that the video frames are played in an order opposite to the positive order. In order to make the solution and the layout clear, the specific implementation of playing the video frames of the video file in reverse order until the first preset video frame will be described later specifically.

The first preset video frame can be set based on factors such as the number of video frames contained in the video file, which is not specifically limited herein. Generally, the first preset video frame is any video frame between the first video frame and the last video frame of the video file. For example, if the video file includes 6 video frames, the first preset video frame can be the third video frame, the second-to-last video frame, or the like.

S103, returning to the step of playing video frames of the video file in positive order, and stopping playing the video file until a stop playing instruction is obtained.

After playing the video frames of the video file in reverse order until the first preset video frame, the electronic device can return to the step of playing video frames of the video file in positive order described above, and looping them. That is to say, after the first preset video frame is played, the video file will be played in positive order again starting from the first video frame of the video file.

When obtaining a stop playing instruction, the electronic device can stop playing the video file. It can be understood that, in an implementation, the electronic device can provide a stop playing entry, such as a stop playing button or the like. When the user wants to stop playing the video file, he can sent a stop playing instruction via the stop playing instruction entry, and then the electronic device can obtain the stop playing instruction.

For example, in one case, the video file is a small video file in a video preview interface of an application, and the small video file is played in a preset area of the video preview interface. When the user clicks on the preset area, the electronic device obtains a stop playing instruction, and stops playing the small video file, and then enters into a video playing interface to play a complete video file corresponding to the small video file.

In another implementation, the stop playing instruction can be sent by a user via another device that established a communication connection with the electronic device, and the electronic device obtains the stop playing instruction when receiving the stop playing instruction.

As can be seen, in the solution provided by the embodiment of the present application, the electronic device plays video frames of a video file in positive order after obtaining an instruction for playing the video file, and after the last video frame of the video file is played, the electronic device plays the video file in reverse order until a first preset video frame, and then returns to the step of looping video frames of the video file in positive order until obtaining a stop playing instruction. The solution breaks through the traditional thinking pattern that looping a video must jump from the last frame to the first frame to loop. In particular for a small video as a video preview, when looping the small video, the video file is played in positive order and then played in reverse order until a first preset video frame. Since the jumping of contents of the video file is small, the flickering feeling brought to a user when a video file is played can be reduced and user experience can be improved.

For the case where each of the video frames of the video file contains a video frame identifier, as an implementation of the embodiment of the present application, the step of playing the video frames of the video file in reverse order until a first preset video frame can include:

obtaining the second-to-last video frame of the video file based on the video frame identifier contained in each of the video frames; and playing the video frames of the video file in reverse order until the first preset video frame, starting from the second-to-last video frame.

The video frame identifier can be a frame number, a timestamp, an offset of the video frame and the like, which is not specifically limited herein, as long as the order of the video frames can be identified.

In this way, after the last video frame of the video file is played, the electronic device can obtain the second-to-last video frame of the video file based on the video frame identifier contained in each of the video frames, and then play the video frames of the video file in reverse order starting from the second-to-last video frame until the first preset video frame.

For example, the video frame identifier is assumed to be the frame number of the video frame, if the above video file includes 9 video frames, the frame numbers of the first video frame to the last video frame are 1 to 9. After the last video frame of the video file is played, the electronic device can obtain the second-to-last video frame of the video file whose frame number is 8 based on the frame number of each of the video frames, and then play the video frames of the video file in reverse order starting from the second-to-last video frame whose frame number is 8 until the first preset video frame.

As an implementation of the embodiment of the present application, the first preset video frame described above is the second video frame of the video file described above. That is to say, after the last video frame of the video file is played, the electronic device plays the video frames of the video file in reverse order until the second video frame, and then plays the video frames of the video file in positive order starting from the first video frame of the video file again. In this way, since the second video frame and the first video frame of the video file are consecutive video frames, there is a smaller difference between the video content, the flicker the user feels when watching the video file can be further reduced and user experience can be further improved.

The second method for looping a video file provided by an embodiment of the present application will be described below.

First, it should be noted that the second method for looping a video file provided by the embodiment of the present application can be applied to any electronic device capable of playing a video file (hereafter referred to as an electronic device), for example, a mobile phone, a computer, a tablet, a smart watch and the like, which is not specifically limited herein.

Figure 2:
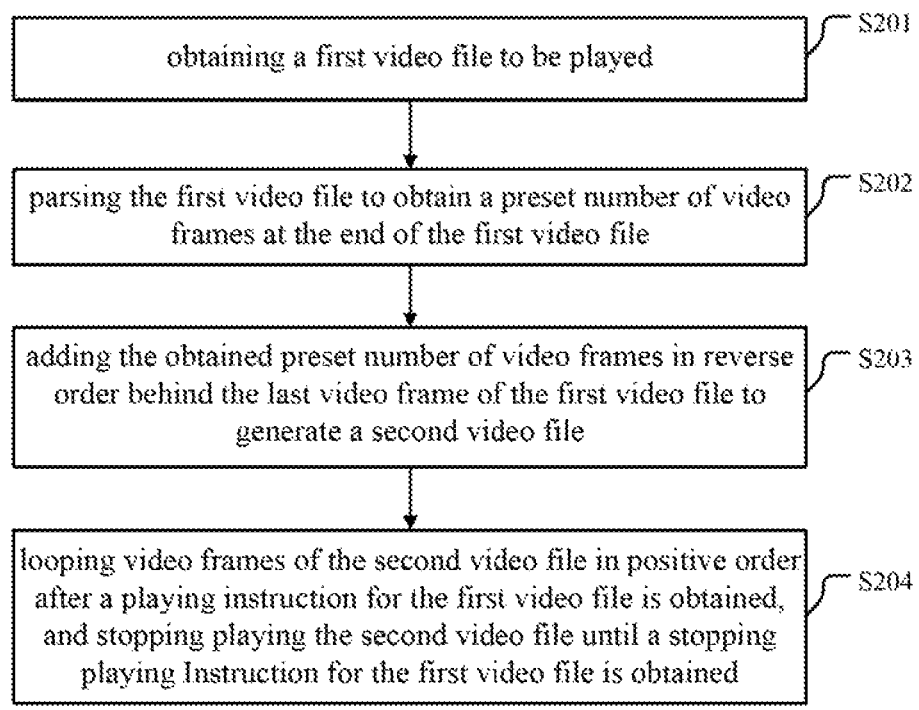
FIG. 2 is a flow chart of the second method for looping a video file provided by an embodiment of the present application.

FIG. 2 shows a method for looping a video file. The method comprises:

S201, obtaining a first video file to be played.

The first video file is generally a certain video file stored in an electronic device. In a case where the electronic device has a camera, the first video file can be a video file taken by a user via the camera of the electronic device. Of course, the first video file can be a video file downloaded from the Internet by the user, such as a small video file, or can be a video file sent by another device that established a communication connection with the electronic device.

S202, parsing the first video file to obtain a preset number of video frames at the end of the first video file.

After obtaining the first video file, the electronic device can parse the first video file and then obtain the preset number of video frames at the end of the first video file. The parsing process can use any video parsing approach in the related art, which is not specifically limited herein.

It should be noted that the preset number described above can be determined based on factors such as the number of video frames contained in the first video file, for example, it can be 2, 3, 5, or the like, which is not limited herein. It can be understood that the preset number will not exceed the number of video frames contained in the first video file.

It should be further noted that the video frames at the end of the first video file refer to the video frames before the last video frame of the first video file, for example, the second-to-last video frame, the third-to-last video frame and the like.

In order to make the solution and the layout clear, the specific implementation of parsing the first video file to obtain a preset number of video frames at the end of the first video file will be described with an example later.

S203, adding the obtained preset number of video frames in reverse order behind the last video frame of the first video file to generate a second video file.

After obtaining the preset number of video frames, the electronic device can add the obtained preset number of video frames in reverse order behind the last video frame of the first video file described above to generate a second video file. It can be understood that the reverse order is an order that is opposite to the order of the video frames in the first video file.

For example, if the preset number of video frames obtained by the electronic device are the second-to-last video frame and the third-to-last video frame, the electronic device can add the second-to-last video frame and then add the third-to-last video frame behind the last video frame of the first video file to generate the second video file.

That is to say, if the first video file contains 6 video frames, the second-to-last video frame and the third-to-last video frame are the fourth video frame and the fifth video frame respectively. The generated second video file thus contains the first to the sixth video frames of the first video file and, after the sixth video frame, further contains the fifth video frame and the fourth video frame, i.e. it contains 8 video frames in total. The order of the video frames in the second video file is: the first to the sixth frames and the fifth frame and the fourth frame.

S204, looping video frames of the second video file in positive order after a playing instruction for the first video file is obtained, and stopping playing the second video file until a stop playing instruction for the first video file is obtained.

After generating the second video file, when the electronic device obtains a playing instruction for the first video file, it can loop the video frames of the second video file in positive order, and stop playing the second video file until a stop playing instruction for the first video file is obtained.

It can be understood that the video frames of the second video file are looped in a positive order, that is, the video frames of the second video file are played starting from the first video frame to the last video frame, and after the last video frame of the second video file is played, then the second video file is played again starting from the first video frame of the second video file, thus the second video file is looped.

For the approach of obtaining a playing instruction and a stop playing instruction, the electronic device can provide a playing instruction entry and a stop playing instruction entry, such as a play button, a stop button or the like. When the user wants to play the first video file, he can send a playing instruction via the playing instruction entry, and then the electronic device can obtain the playing instruction. It can be understood that the electronic device can create a correspondence between the playing instruction entry and the first video file and a correspondence between the first video file and the second video file in advance. After obtaining the playing instruction, the electronic device can find the second video file. Of course, the playing instruction can carry identification information of the first video file, so that after obtaining the playing instruction, the electronic device can find the first video file corresponding to the identification information and then find the second video file.

For example, if the first video file is a small video file in a video preview interface of an application, the playing instruction entry can be the video preview interface. When a user starts the video preview interface, the electronic device can obtain a playing instruction. A small video file is generally played in a preset area of the video preview interface. When the user clicks on the preset area, the electronic device obtains a stop playing instruction, and stops playing the small video file, and then enters into a video playing interface to play a complete video file corresponding to the small video file.

In another implementation, the playing instruction and the stop playing instruction can be sent by a user via another device that established a communication connection with the electronic device, and the electronic device obtains the playing instruction or the stop playing instruction when receiving the playing instruction or the stop playing instruction.

As can be seen, in the solution provided by the embodiment of the present application, the electronic device obtains a first video file to be played, parses the first video file to obtain a preset number of video frames at the end of the first video file, then adds the obtained preset number of video frames in reverse order behind the last video frame of the first video file to generate a second video file, and loops video frames of the second video file in positive order after obtaining a playing instruction for the first video file, until a stop playing instruction for the first video file is obtained. Since a preset number of video frames are added in reverse order after the last video frame of the first video file, when the second video file is played in positive order, the jumping of contents of the video file is small, which reduces the flickering feeling brought to a user when playing the video file and improves user experience.

For the case where each of the video frames of the first video file contains a video frame identifier, as an implementation of the embodiment of the present application, the step of parsing the first video file to obtain a preset number of video frames at the end of the first video file can include:

parsing the first video file to obtain a video frame identifier contained in each of the video frames; obtaining a preset number of video frames from the second-to-last video frame to a second preset video frame in the first video file based on the obtained video frame identifiers.

The video frame identifier can be a frame number, a timestamp, an offset of the video frame and the like, which is not specifically limited herein, as long as the order of the video frames can be identified.

In this way, after obtaining the first video file, the electronic device can parse the first video file to obtain a video frame identifier contained in each of the video frames; and then obtains a preset number of video frames from the second-to-last video frame to the second preset video frame in the first video file based on the obtained video frame identifiers.

For example, if video frame identifiers are frame numbers and the first video file contains 6 video frames, the electronic device can parse the first video file after obtaining the first video file to obtain the frame number contained in each of the video frames, i.e. 1 to 6, the electronic device can then obtain the second-to-last video frame (i.e. the video frame whose frame number is 5) to the second preset video frame from the video frames whose frame numbers are 1 to 6. If the second preset video frame is the third-to-last video frame, the frame number is 4 and the electronic device can obtain three frame frames whose frame numbers are 6, 5 and 4.

As an implementation of the embodiment of the present application, the second preset video frame is the second video frame of the first video file. That is to say, after obtaining the first video file, the electronic device parses the first video file and then obtains the second-to-last video frame to the second video frame in the first video file. In this way, the second video file contains the first to the last video frames of the first video file and, after the last video frame, contains the second-to-last video frame to the second video frame in reverse order. Since the second video frame and the first video frame of the first video file are consecutive video frames, there is a smaller difference between the video content, the flicker the user feels when watching the second video file can be further reduced and user experience can be further improved.

Corresponding to the embodiment of the first method described above, an embodiment of the present application also provides an apparatus for looping a video file.

An apparatus for looping a video file provided by an embodiment of the present application will be described below.

Figure 3:
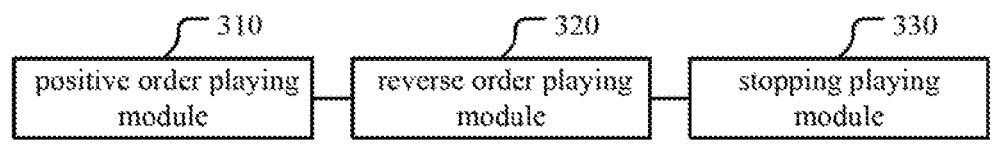
FIG. 3 is a schematic diagram of the structure of the first apparatus for looping a video file provided by an embodiment of the present application.

FIG. 3 shows an apparatus for looping a video file. The apparatus comprises:

a positive order playing module 310, configured for playing video frames of the video file in positive order after a playing instruction for a video file is obtained;

a reverse order playing module 320, configured for playing the video frames of the video file in reverse order until a first preset video frame after the last video frame of the video file is played, and triggering the positive order playing module 310;

a stop playing module 330, configured for stopping playing the video file when a stop playing instruction is obtained.

As can be seen, in the solution provided by the embodiment of the present application, the electronic device plays video frames of the video file in positive order after an instruction for playing a video file is obtained, and plays the video frames of the video file in reverse order until a first preset video frame after the last video frame of the video file is played, and then returns to the step of looping video frames of the video file in positive order until a stop playing instruction is obtained. The solution breaks through the traditional thinking pattern that looping a video must jump from the last frame to the first frame to loop. In particular for a small video as a video preview, when looping the small video, the video file is played in positive order and then played in reverse order until a first preset video frame. Since the jumping of contents of the video file is small, the flickering feeling brought to a user when a video file is played can be reduced and user experience can be improved.

As an implementation of the embodiment of the present application, each of the video frames of the video file contains a video frame identifier.

The reverse order playing module 320 can include:

a video frame determining unit (not shown in FIG. 3), configured for obtaining the second-to-last video frame of the video file based on the video frame identifier contained in each of the video frames;

a reverse order playing unit (not shown in FIG. 3), configured for playing the video frames of the video file in reverse order starting from the second-to-last video frame until the first preset video frame.

As an implementation of the embodiment of the present application, the first preset video frame is the second video frame of the video file.

Corresponding to the embodiment of the second method described above, an embodiment of the present application provides another apparatus for looping a video file.

The second apparatus for looping a video file provided by an embodiment of the present application will be described below.

Figure 4:
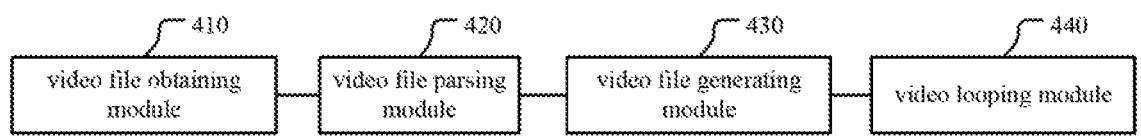
FIG. 4 is a schematic diagram of the structure of the second apparatus for looping a video file provided by an embodiment of the present application.

FIG. 4 shows an apparatus for looping a video file. The apparatus comprises:

a video file obtaining module 410, configured for obtaining a first video file to be played;

a video file parsing module 420, configured for parsing the first video file to obtain a preset number of video frames at the end of the first video file;

a video file generating module 430, configured for adding the obtained preset number of video frames in reverse order behind the last video frame of the first video file to generate a second video file;

a video looping module 440, configured for looping video frames of the second video file in positive order after a playing instruction for the first video file is obtained, and stopping playing the second video file until a stop playing instruction for the first video file is obtained.

As can be seen, in the solution provided by the embodiment of the present application, the electronic device obtains a first video file to be played, parses the first video file to obtain a preset number of video frames at the end of the first video file, then adds the obtained preset number of video frames in reverse order behind the last video frame of the first video file to generate a second video file, and loops video frames of the second video file in positive order after obtaining a playing instruction for the first video file, until a stop playing instruction for the first video file is obtained. Since a preset number of video frames are added in reverse order after the last video frame of the first video file, when the second video file is played in positive order, the jumping of contents of the video file is small, which reduces the flickering feeling brought to a user when playing the video file and improves user experience.

As an implementation of the embodiment of the present application, each of the video frames of the first video file contains a video frame identifier.

The video file parsing module 420 can include:

a video frame identifier obtaining unit (not shown in FIG. 4), configured for parsing the first video file to obtain the video frame identifier contained in each of the video frames;

a video frame obtaining unit (not shown in FIG. 4), configured for obtaining the second-to-last video frame to a second preset video frame in the first video file based on the obtained video frame identifiers.

As an implementation of the embodiment of the present application, the second preset video frame is the second video frame of the first video file.

Figure 5:
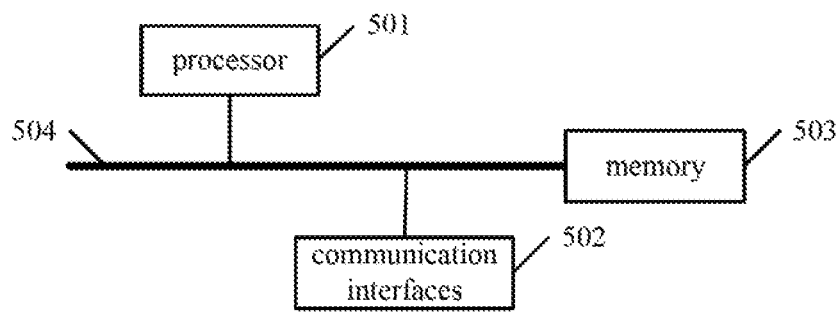
FIG. 5 is a schematic diagram of the structure of the first electronic device according to an embodiment of the present application.

An embodiment of the present application provides an electronic device, as shown in FIG. 5, which includes a processor 501, communication interfaces 502, a memory 503 and a communication bus 504, wherein the processor 501, the communication interfaces 502 and the memory 503 communicate with each other via the communication bus 504.

The memory 503 is configured for storing computer program.

The processor 501 is configured for implementing the following steps when executing the program stored in the memory 503:

playing video frames of the video file in positive order after a playing instruction for a video file is obtained;

playing the video frames of the video file in reverse order until a first preset video frame after the last video frame of the video file is played;

returning to the step of playing video frames of the video file in positive order, and stopping playing the video file until a stop playing instruction is obtained.

As can be seen, in the solution provided by the embodiment of the present application, when executing the program stored in the electronic device, the electronic device plays video frames of the video file in positive order after obtaining a playing instruction of a video file, and plays the video frames of the video file in reverse order until a first preset video frame after the last video frame of the video file is played, and then returns to the step of looping video frames of the video file in positive order until a stop playing instruction is obtained. The solution breaks through the traditional thinking pattern that looping a video must jump from the last frame to the first frame to loop. In particular for a small video as a video preview, when looping the small video, the video file is played in positive order and then played in reverse order until a first preset video frame. Since the jumping of contents of the video file is small, the flickering feeling brought to a user when a video file is played can be reduced and user experience can be improved.

The communication bus aforementioned in the electronic device may be a peripheral component interconnect (PCI) bus or an extended industry standard architecture (EISA) bus and the like. The communication bus can include an address bus, a data bus, a control bus, or the like. For representation, only one thick line is shown in the figure, which does not mean there is only one communication bus or one type of communication bus.

The communications interfaces are configured for communication between the aforementioned electronic device and other devices.

The memory can include a random access memory (RAM), or can include a non-volatile memory (NVM), for example at least one disk memory. Optionally, the memory can also be at least one storage device located away from the processor described above.

The above processor can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic device, a discrete gate or transistor logic device, a discrete hardware component.

Each of the video frames of the video file described above can contain a video frame identifier.

The step of playing the video frames of the video file in reverse order until a first preset video frame described above can include:

obtaining the second-to-last video frame of the video file based on the video frame identifier contained in each of the video frames;

playing the video frames of the video file in reverse order until a first preset video frame, starting from the second-to-last video frame.

The first preset video frame described above can be the second video frame of the video file.

Figure 6:
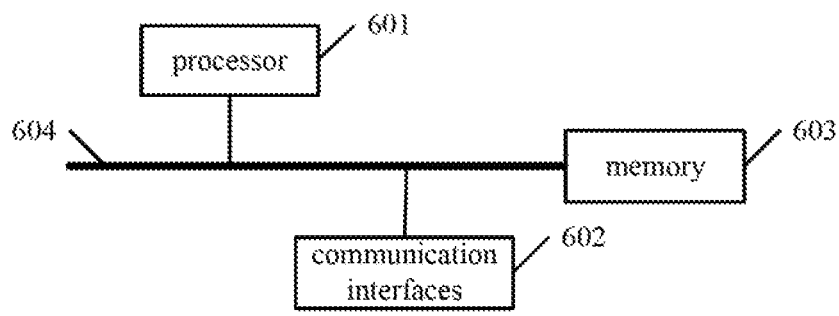
FIG. 6 is a schematic diagram of the structure of the second electronic device according to an embodiment of the present application.

An embodiment of the present application provides an electronic device, as shown in FIG. 6, which comprises a processor 601, communication interfaces 602, a memory 603 and a communication bus 604, wherein the processor 601, the communication interfaces 602 and the memory 603 communicate with each other via the communication bus 604.

The memory 603 is configured for storing computer program.

The processor 601 is configured for implementing the following steps when executing the program stored in the memory 603:

obtaining a first video file to be played;

parsing the first video file to obtain a preset number of video frames at the end of the first video file;

adding the obtained preset number of video frames in reverse order behind the last video frame of the first video file to generate a second video file;

looping video frames of the second video file in positive order after a playing instruction for the first video file is obtained, and stopping playing the second video file until a stop playing instruction for the first video file is obtained.

As can be seen, in the solution provided by the embodiment of the present application, when executing the program stored in the electronic device, the electronic device obtains a first video file to be played, parses the first video file to obtain a preset number of video frames at the end of the first video file, then adds the obtained preset number of video frames in reverse order behind the last video frame of the first video file to generate a second video file, and loops video frames of the second video file in positive order after obtaining a playing instruction for the first video file, until a stop playing instruction for the first video file is obtained. Since a preset number of video frames are added in reverse order behind the last video frame of the first video file, when the second video file is played in positive order, the jumping of the contents of the video file is small, which reduces the flickering feeling brought to a user when playing the video file and improves user experience.

The communication bus aforementioned in the electronic device may be a peripheral component interconnect (PCI) bus or an extended industry standard architecture (EISA) bus and the like. The communication bus can include an address bus, a data bus, a control bus, or the like. For representation, only one thick line is shown in the figure, which does not mean there is only one communication bus or one type of communication bus.

The communications interfaces are configured for communication between the above electronic device and other devices.

The memory can include a random access memory (RAM), or can include a non-volatile memory (NVM), for example at least one disk memory. Optionally, the memory can also be at least one storage device located away from the processor described above.

The above processor can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic device, a discrete gate or transistor logic device, a discrete hardware component.

Each of the video frames of the first video file described above can contain a video frame identifier.

The step of parsing the first video file to obtain a preset number of video frames at the end of the first video file described above can include:

parsing the first video file to obtain a video frame identifier contained in each of the video frames;

obtaining the second-to-last video frame to a second preset video frame in the first video file based on the obtained video frame identifiers.

The second preset video frame described above can be the second video frame of the first video file.

An embodiment of the present application provides a computer readable storage medium. The computer readable storage medium stores computer program therein. A processor implements the following steps when executing the computer program:

playing video frames of the video file in positive order after a playing instruction for a video file is obtained;

playing the video frames of the video file in reverse order until a first preset video frame after the last video frame of the video file is played;

returning to the step of playing video frames of the video file in positive order, and stopping playing the video file until a stop playing instruction is obtained.

As can be seen, in the solution provided by the embodiment of the present application, when the computer program being executed by a processor, the electronic device plays video frames of a video file in positive order after obtaining a playing instruction of the video file, and plays the video file in reverse order until a first preset video frame after the last video frame of the video file is played, and then returns to the step of looping video frames of the video file in positive order until a stop playing instruction is obtained. The solution breaks through the traditional thinking pattern that looping a video must jump from the last frame to the first frame to loop. In particular for a small video as a video preview, when looping the small video, the video file is played in positive order and then played in reverse order until a first preset video frame. Since the jumping of contents of the video file is small, the flickering feeling brought to a user when a video file is played can be reduced and user experience can be improved.

Each of the video frames of the video file described above can contain a video frame identifier.

The step of playing the video frames of the video file in reverse order until a first preset video frame described above can include:

obtaining the second-to-last video frame of the video file based on the video frame identifier contained in each of the video frames;

playing the video frames of the video file in reverse order until a first preset video frame, starting from the second-to-last video frame.

The first preset video frame described above can be the second video frame of the video file.

An embodiment of the present application provides another computer readable storage medium. The computer readable storage medium stores computer program therein. A processor implements the following steps when executing the computer program:

obtaining a first video file to be played;

parsing the first video file to obtain a preset number of video frames at the end of the first video file;

adding the obtained preset number of video frames in reverse order behind the last video frame of the first video file to generate a second video file;

looping video frames of the second video file in positive order after a playing instruction for the first video file is obtained, and stopping playing the second video file until a stop playing instruction for the first video file is obtained.

As can be seen, in the solution provided by the embodiment of the present application, when the computer program being executed by a processor, the electronic device obtains a first video file to be played, parses the first video file to obtain a preset number of video frames at the end of the first video file, then adds the obtained preset number of video frames in reverse order behind the last video frame of the first video file to generate a second video file, and loops video frames of the second video file in positive order after obtaining a playing instruction for the first video file, until a stop playing instruction for the first video file is obtained. Since a preset number of video frames are added in reverse order behind the last video frame of the first video file, when the second video file is played in positive order, the jumping of contents of the video file is small, which reduces the flickering feeling brought to a user when playing the video file and improves user experience.

Each of the video frames of the first video file described above can contain a video frame identifier.

The step of parsing the first video file to obtain a preset number of video frames at the end of the first video file described above can include:

parsing the first video file to obtain a video frame identifier contained in each of the video frames;

obtaining the second-to-last video frame to a second preset video frame in the first video file based on the obtained video frame identifiers.

The second preset video frame described above can be the second video frame of the first video file.

An embodiment of the present application provides a computer program product for performing the following steps when being executed:

playing video frames of the video file in positive order after a playing instruction for a video file is obtained;

playing the video frames of the video file in reverse order until a first preset video frame after the last video frame of the video file is played;

returning to the step of playing video frames of the video file in positive order, and stopping playing the video file until a stop playing instruction is obtained.

Each of the video frames of the video file described above can contain a video frame identifier.

The step of playing the video frames of the video file in reverse order until a first preset video frame described above can include:

obtaining the second-to-last video frame of the video file based on the video frame identifier contained in each of the video frames;

playing the video frames of the video file in reverse order until a first preset video frame, starting from the second-to-last video frame.

The first preset video frame described above can be the second video frame of the video file.

An embodiment of the present application provides a second computer program product for performing the following steps when being executed:

obtaining a first video file to be played;

parsing the first video file to obtain a preset number of video frames at the end of the first video file;

adding the obtained preset number of video frames in reverse order behind the last video frame of the first video file to generate a second video file;

looping video frames of the second video file in positive order after a playing instruction for the first video file is obtained, and stopping playing the second video file until a stop playing instruction for the first video file is obtained.

Each of the video frames of the first video file described above can contain a video frame identifier.

The step of parsing the first video file to obtain a preset number of video frames at the end of the first video file described above can include:

parsing the first video file to obtain a video frame identifier contained in each of the video frames;

obtaining the second-to-last video frame to a second preset video frame in the first video file based on the obtained video frame identifiers.

The second preset video frame described above can be the second video frame of the first video file.

It should be noted that, for embodiments of the apparatus, electronic device, computer readable storage medium, and computer program product, since they are substantially similar to the method embodiments, the description is relatively simple, and the similar parts could refer to the parts in the description of method embodiments.

It should be further noted that the relationship terms herein such as "first", "second" and the like, if any, are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. Especially for embodiments of a system, since they are similar to method embodiments, the description thereof is relatively simple; the similar parts could refer to the parts in the description of method embodiments.

The embodiments described above are merely preferred embodiments of the present application, and not intended to limit the scope of the present application. Any modifications, equivalents, improvements or the like within the spirit and principle of the application should be included in the scope of the protection of the present application.

The invention claimed is:

1. A method for looping a video file, applicable to an electronic device capable of playing the video file and comprising:

playing video frames of the video file in positive order after a playing instruction for the video file is obtained, wherein each of the video frames of the video file contains a video frame identifier;

obtaining a second-to-last video frame of the video file based on the video frame identifier contained in each of the video frames, and playing the video frames of the video file in reverse order starting from the second-to-last video frame until a first preset video frame after the last video frame of the video file is played;

returning to the step of playing the video frames of the video file in positive order until a stop playing instruction is obtained to stop playing the video file.

2. The method of claim 1, wherein the first preset video frame is the second video frame of the video file.

3. A method for looping a video file, applicable to an electronic device capable of playing the video file and comprising:

obtaining a first video file to be played, wherein each of the video frames of the first video file contains a video frame identifier;

parsing the first video file to obtain a video frame identifier contained in each of the video frames, and obtaining a preset number of video frames from a second-tolast video frame to a second preset video frame in the first video file based on the obtained video frame identifiers;

adding the obtained preset number of video frames in reverse order behind the last video frame of the first video file to generate a second video file;

looping video frames of the second video file in positive order after a playing instruction for the first video file is obtained until a stop playing instruction for the first video file is obtained to stop playing the video file.

4. The method of claim 3, wherein the second preset video frame is the second video frame of the first video file.

5. An electronic device, which comprises a processor, communication interfaces, a memory and a communication bus, wherein the processor, the communication interfaces and the memory communicate with each other via the communication bus;

the memory is configured for storing computer program;

the processor is configured for implementing steps of the method of claim 3 when executing the program stored in the memory.

6. A computer readable non-transitory storage medium, which stores computer program, wherein the computer program implements steps of the method of claim 3 when being executed by a processor.

7. An electronic device, which comprises a processor, communication interfaces, a memory and a communication bus, wherein the processor, the communication interfaces and the memory communicate with each other via the communication bus;

the memory is configured for storing computer program;

the processor is configured for implementing steps of the method of claim 1 when executing the program stored in the memory.

8. A computer readable non-transitory storage medium, which stores computer program, wherein the computer program implements steps of the method of claim 1 when being executed by a processor.

* * * * *